United States Patent

[11] 3,580,648

| [72] | Inventors | Stanley C. Zink<br>Northport;<br>Joseph J. Slane, Fulton, both of, N.Y. |
|---|---|---|
| [21] | Appl. No. | 814,114 |
| [22] | Filed | Apr. 7, 1969 |
| [45] | Patented | May 25, 1971 |
| [73] | Assignee | The Black Clawson Company<br>Hamilton, Ohio |

[54] ROLL AND ANTIFRICTION BEARING ASSEMBLY
5 Claims, 3 Drawing Figs.

| [52] | U.S. Cl. | 308/207 |
|---|---|---|
| [51] | Int. Cl. | F16c 35/06 |
| [50] | Field of Search | 308/207, 234, 180 |

[56] References Cited
UNITED STATES PATENTS

| 1,684,799 | 9/1928 | Kochendorfer | 308/207 |
|---|---|---|---|
| 3,156,586 | 11/1964 | Scheifete et al. | 308/207.1 |

FOREIGN PATENTS

| 923,451 | 4/1963 | Great Britain | 308/207 |
|---|---|---|---|

Primary Examiner—Fred C. Mattern, Jr.
Assistant Examiner—Frank Susko
Attorney—Marechal, Biebel, French and Bugg ABSTRACT: Each journal of a roll is supported by an antifriction roller bearing including an outer race and two inner races spaced axially by a ring of predetermined thickness. The inner races and the spacer ring are pressed axially against a shoulder on the journal by a plurality of jackscrews extending axially through a locknut for minimizing radial runout of the roll.

PATENTED MAY 25 1971    3,580,648

INVENTORS
STANLEY C. ZINK &
JOSEPH J. SLANE
BY
Marechal, Biebel, French & Bugg
ATTORNEYS 3,580,648

1

ROLL AND ANTIFRICTION BEARING ASSEMBLY

BACKGROUND OF THE INVENTION

In an antifriction bearing assembly for supporting the journal of a roll for coating a web paper material, it is desirable to minimize the radial runout of the journal and the roll to within 0.0001 inch to obtain uniform coating of the web. Usually a tapered roller bearing is employed for supporting each journal of the roll, and the inner race of each bearing is tightened against a shoulder on the journal by threading a locknut on the journal in pressure engagement with the inner race. It has been found that the locknut face which engages the inner race is often not precisely square with the journal axis, and as a result, the inner race is cocked slightly by the locknut causing a radial runout of the roll journal. Furthermore, the cocking of the locknut and the inner race produce slight wobbling of the outer race and its supporting housing thereby preventing precision running of the bearing.

SUMMARY OF THE INVENTION

The present invention is directed to an improved antifriction bearing assembly especially suited for supporting the journal of a roll and which eliminates any significant wobble of the bearing housing and minimizes radial runout of the journal relative to the housing. In accordance with the preferred embodiment of the invention, the antifriction roller bearing assembly includes a pair of inner races which are mounted on the journal adjacent a shoulder having an axial runout of less than 0.0001 inch. A spacer ring of predetermined thickness is positioned between the inner races, and a locknut is threaded onto the journal in spaced relation to the outermost inner race.

The locknut supports a plurality of circumferentially spaced and axially extending jackscrews each having a swivel footpad and tightened to a predetermined torque for clamping the assembly of the inner races and the spacer ring against the journal shoulder. The outer race of the roller bearing is supported by a housing which has a cap member on each end for enclosing the bearing and locknut assembly. A seal member is supported by each end cap member, and passages are formed within the cap members for circulating lubricating oil axially through the bearing. BRIEF DESCRIPTION OF THE DRAWING FIG. 1 is an axial section of an antifriction bearing constructed and assembled on the journal of a roll in accordance with the invention;

DESCRIPTION OF THE PREFERRED EMBODIMENT

Figure 1:
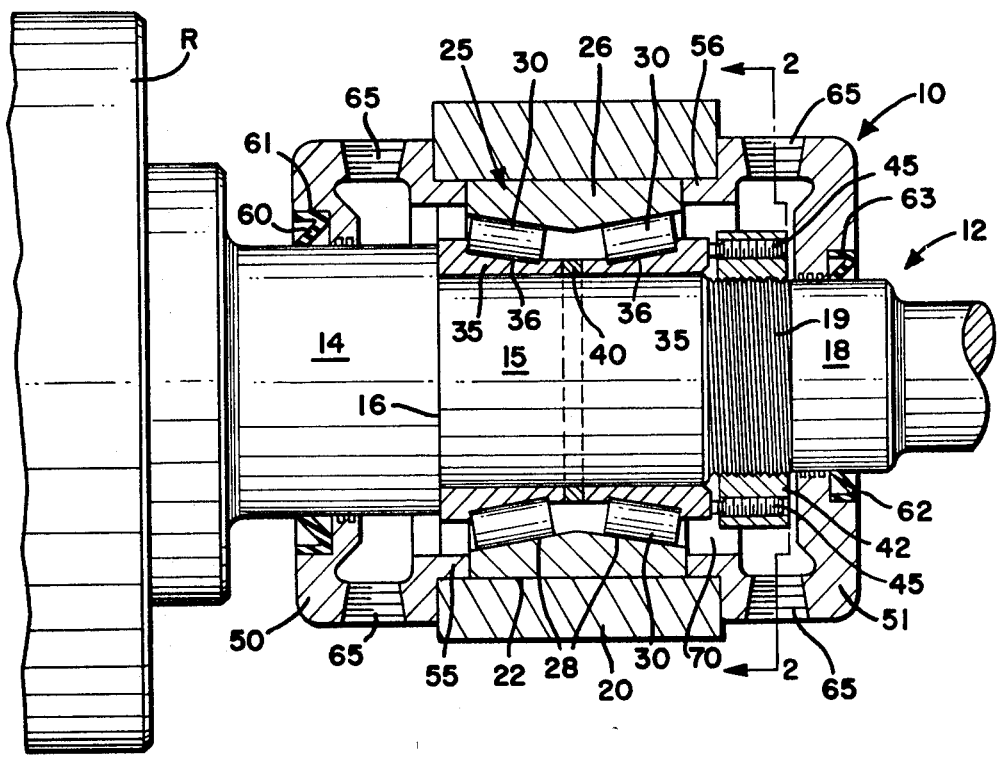

Referring to the drawing, a bearing assembly 10 is mounted on one journal 12 of a roll R. The journal 12 includes a cylindrical portion 14 from which extends a cylindrical portion 15 of smaller diameter for defining a radial shoulder 16. Preferably, the shoulder 16 is ground to have an axial runout of less than 0.0001 inch. The journal 12 further includes a cylindrical portion 18 having external threads 19 with an outer diameter somewhat less than the outer diameter of the cylindrical portion 15. It is to be understood that the journal at the opposite end of the roll R has substantially the same configuration as the journal 12 and is also supported by a bearing assembly constructed in accordance with invention.

The bearing assembly 10 includes a housing 20 having a generally rectangular outer configuration and a cylindrical bore 22. An antifriction roller bearing 25 includes an outer race 26 which fits snugly within the bore 22 of the housing 20 and which has a pair of ground frustoconical inner surfaces 28. A plurality of cylindrical rollers 30 are retained by each surface 28 and are arranged in circumferentially spaced relation by a suitable cage (not shown).

2

The bearing 25 includes a pair of inner races 35 each having a frustoconical outer surface 36 which engages the adjacent set of rollers 30. The inner races 35 are mounted on the cylindrical portion 15 of the journal 12 with the innermost race 35 positioned adjacent the shoulder 16. A precision spacer ring 40 of rectangular cross section is positioned between the inner races 35 and has a predetermined thickness which spaces the inner races 35 at a precise distance so that the rollers 30 revolve between each inner race 35 and the outer race 26 with zero clearance.

Figure 2:
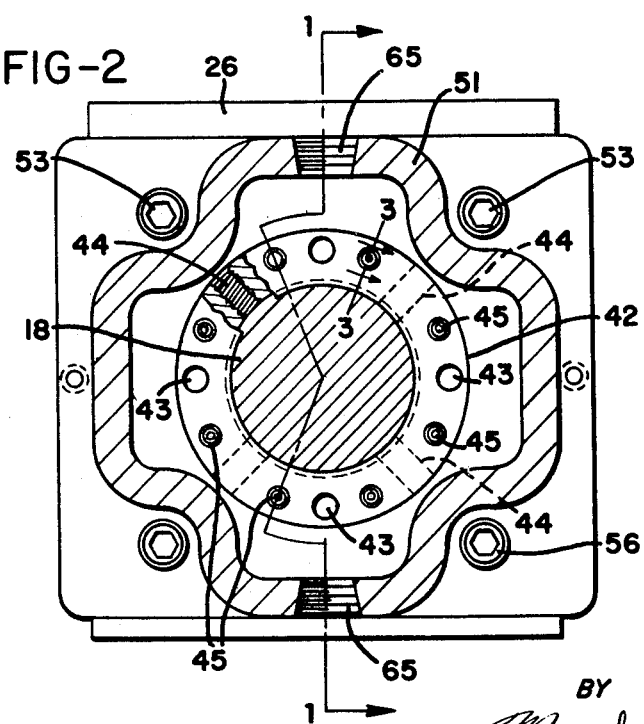
FIG. 2 is a section taken generally on the line 2-2 of FIG. 1.
Figure 3:
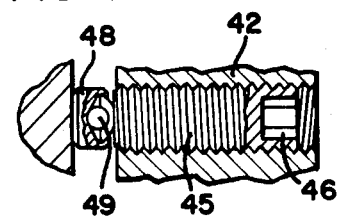
FIG. 3 is an enlarged fragmentary section taken generally on the line 3-3 of FIG. 2.

A locknut 42 is mounted on the threaded portion 19 of the journal 12 and has a plurality of axially extending blink holes 43 (FIG. 2) for receiving a spanner wrench. A plurality of setscrews 44 extend radially through the nut 42, and a plurality of circumferentially spaced jackscrews 45 extend axially through the nut 42. Each jackscrew 45 includes a socket head 46 (FIG. 3) and a swivel footpad 48 which seats on a ball 49 retained within a cavity formed within the forward end of the jackscrew.

Inner and outer cap members 50 and 51 are secured in clamping relation with the ends of the housing 20 by a set of through bolts 53, and each of the camp members includes an annular portion 55, 56 which projects into the bore 22 to retain the outer race 26 within the housing 20. An annular flexible seal 60 is retained within a counterbore 61 formed within the inner cap member 50 and contacts the cylindrical portion 14 of the journal 12. A similar annular flexible seal 62 is retained within a counterbore 63 formed within the outer cap member 51 and contacts the cylindrical portion 18 of the journal 12. Threaded openings 65 are formed within each of the cap members 50 and 51 and are connected to oil lines (not shown) for circulating lubricating oil axially through the bearing 25 between the rollers 30.

Preferably, the bearing assembly 10 is mounted on the journal 12 in the following manner. First, the bearing 25 is mounted on the journal portion 15 without the housing 20 and without the end caps 50 and 51 and the spacer ring 40. The locknut 42 without the jackscrews 45 is threaded onto the journal portion 18 and is hand tightened to a preload torque of approximately 7 foot pounds. The outer race 26 on each end of the roll R is set within a V-block, and the outermost inner race 35 of each bearing is adjusted until it has an axial runout of less than 0.0001 inch. The locknut 42 is then removed, and the overall axial dimension of the inner races 35 is determined with a micrometer.

The bearing 25 is then removed from the journal 12, and the axial length of each inner race 35 is subtracted from the overall length of the assembled inner races 35 to determine the precise thickness of a spacer ring 40 for providing zero clearance between the rollers 30 and the inner and outer races of the bearing. The ring 40 is produced on a surface grinder so that it has a precisely uniform thickness. The bearing 25 is again mounted on the journal 12 along with the spacer ring 40 and the inner cap 50, and the locknut 42 is hand tightened to assure metal-to-metal contact of the inner races 35, the spacer ring 40 and the shoulder 16. Locknut 42 is then backed off, and the outermost inner race 35 is checked for an axial runout of less than 0.0001 inch.

The locknut 42 is adjusted until a gap 70 of approximately one-eighth inch is produced between the locknut 42 and the outer end surface of the adjacent inner race 35. The locknut 42 is secured to the spindle portion 19 by tightening the setscrews 44, and the jackscrews 45 are individually tightened to a uniform torque. The outer race 26 of the bearing 25 on each end of the roll R is again set in a V-block, and the roll R is slowly rotated to check that the radial runout of the roll is less than 0.0001 inch. After this check, the housing 20 is mounted on the outer race 26 and the cylindrical portion 55 of the inner cap 50, and the outer cap 51 is mounted on a housing 20 to complete the overall bearing assembly 10.

From the drawing and the above description, it is apparent that a bearing assembly in accordance with the invention provides desirable features. For example, by determining the precise thickness of the spacer ring 40 in the manner described above, and by combining the spacer ring 40 with the square shoulder 16 and the jackscrews 45 tightened to a predetermined torque, the roller 30 are retained between the inner and outer races with zero clearance and with a predetermined preload so that the roll R is supported with minimum radial runout. Furthermore, the cooperation of the shoulder 16, the spacer ring 40 and the jackscrews 45 provide for minimum axial runout of the inner races 35 so that wobbling of the outer race 26 and the housing 20 is effectively eliminated. Moreover, the circumferentially spaced jackscrews 45 are especially effective in producing a uniform and circumferentially distributed axial force against the inner races 35 to provide a uniform loading on the rollers 30.

While the form of apparatus and method herein described constitutes a preferred embodiment of the invention, it is to be understood that the invention is not limited to this precise form of apparatus and method, and that changes may be made therein without departing from the scope of the invention which is defined in the appended claims.

What we claim is:

1. An assembly comprising a roll including opposite end journals each having a radially extending shoulder, an antifriction support bearing mounted on each said journal, each said bearing including a pair of inner races positioned in axially spaced relation on said journal with one of said inner races engaging the corresponding said shoulder of said journal, annular outer race means surrounding said inner races of each said bearing, a plurality of rollers spaced circumferentially between said outer race means and each said inner race, an annular spacer located axially between said inner races of each said bearing and having a predetermined uniform thickness, a nut member mounted on each said journal, and a plurality of circumferentially spaced jackscrews mounted on each said nut member and extending axially into engagement with the adjacent said inner race for applying a uniform and circumferentially distributed axial force against said inner races of each said bearing to clamp said inner races and said spacer against the corresponding said shoulder and thereby to minimize radial runout of each said journal relative to said outer race means of the corresponding said bearing.

2. An assembly as defined in claim 1 wherein each said jackscrew includes a swivel footpad for engaging the adjacent said inner race.

3. An assembly comprising a roll including opposite end journals each having a radially extending shoulder, an antifriction support bearing mounted on each said journal, each said bearing including a pair of inner races having generally inwardly converging tapered outer surfaces and positioned axially on said journal with one of said inner races confined by the corresponding said shoulder of said journal, annular outer race means surrounding said inner races of each said bearing and having correspondingly tapered and converging inner surfaces, a plurality of rollers spaced circumferentially between each set of said inner and outer surfaces, a nut member threadably mounted on each said journal, a plurality of circumferentially spaced jackscrews mounted on each said nut member and extending axially into pressure engagement with the adjacent said inner race, and means for adjusting each said jackscrew for applying a uniform and circumferentially distributed axial force against the adjacent said inner race for effectively eliminating radial runout of each said journal relative to said outer race means of the corresponding said bearing.

4. An assembly as defined in claim 3 including a housing supporting said outer race means, cap member mounted on each end of said housing, seal means mounted on each said cap member for engaging the journal, and means forming passages within said cap members for circulating a fluid lubricant axially between said rollers.

5. An assembly as defined in claim 3 wherein each said jackscrew includes a swivel footpad for engaging the adjacent said inner race.